United States Patent
Dandekar et al.

(10) Patent No.: US 8,898,659 B2
(45) Date of Patent: Nov. 25, 2014

(54) METHOD AND APPARATUS TO CUSTOMIZE AND CONFIGURE MULTIPLE OPERATING SYSTEMS ON A SERVER

(75) Inventors: Shree A. Dandekar, Round Rock, TX (US); Alan E. Beelitz, Leander, TX (US); Tad S. Goodwin, Dripping Springs, TX (US); Paul J. Maia, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 1834 days.

(21) Appl. No.: 11/562,185

(22) Filed: Nov. 21, 2006

(65) Prior Publication Data

US 2008/0120613 A1 May 22, 2008

(51) Int. Cl.
G06F 9/445 (2006.01)
G06F 9/44 (2006.01)

(52) U.S. Cl.
CPC ................................. *G06F 9/441* (2013.01)
USPC .......................................... 717/174; 717/175

(58) Field of Classification Search
USPC ....................................................... 717/174
See application file for complete search history.

(56) References Cited

U.S. PATENT DOCUMENTS

| | | | |
|---|---|---|---|
| 5,991,543 A | 11/1999 | Amberg et al. ............... 395/712 |
| 5,995,757 A | 11/1999 | Amberg et al. ............... 395/712 |
| 6,064,387 A | 5/2000 | Canaday et al. .............. 345/357 |
| 6,182,275 B1 | 1/2001 | Beelitz et al. ...................... 717/1 |
| 6,202,070 B1 | 3/2001 | Nguyen et al. ................ 707/104 |
| 6,236,901 B1 | 5/2001 | Goss ................................. 700/95 |
| 6,247,128 B1 | 6/2001 | Fisher et al. .................. 713/100 |
| 6,262,726 B1 | 7/2001 | Stedman et al. .............. 345/333 |
| 6,298,427 B1 | 10/2001 | Beelitz ........................... 711/173 |
| 6,298,443 B1 | 10/2001 | Colligan et al. .............. 713/200 |
| 6,327,706 B1 | 12/2001 | Amberg et al. ................ 717/11 |
| 6,385,766 B1 | 5/2002 | Doran, Jr. et al. .............. 717/11 |
| 6,425,078 B1 | 7/2002 | Smith et al. ...................... 713/1 |
| 6,427,091 B1 | 7/2002 | Davis et al. .................. 700/115 |
| 6,487,522 B1 | 11/2002 | Smith et al. .................. 702/186 |
| 6,505,094 B2 | 1/2003 | Pape et al. .................... 700/217 |
| 6,516,242 B1 | 2/2003 | Brown ......................... 700/216 |
| 6,519,762 B1 | 2/2003 | Colligan et al. ................ 717/11 |
| 6,543,047 B1 | 4/2003 | Vrhel, Jr. et al. ............. 717/121 |
| 6,550,062 B2 | 4/2003 | Barajas et al. ................ 717/178 |
| 6,591,418 B2 | 7/2003 | Bryan et al. .................. 717/177 |
| 6,804,774 B1 * | 10/2004 | Larvoire et al. .................. 713/2 |
| 6,928,579 B2 * | 8/2005 | Aija et al. .................... 714/6.11 |
| 2004/0039868 A1 * | 2/2004 | Lush ................................. 711/4 |
| 2004/0064268 A1 * | 4/2004 | Gillenwater et al. ........... 702/40 |
| 2004/0268342 A1 * | 12/2004 | Hyden et al. .................. 717/174 |
| 2006/0265627 A1 * | 11/2006 | Trump et al. .................... 714/30 |
| 2006/0294515 A1 * | 12/2006 | Gimpl et al. .................. 717/174 |

\* cited by examiner

*Primary Examiner* — Li B Zhen
*Assistant Examiner* — Hang Pan
(74) *Attorney, Agent, or Firm* — Terrile, Cannati, Chambers & Holland, LLP; Stephen A. Terrile

(57) ABSTRACT

A fixed image factory installation system which enables installation and launching of additional partitions or volumes. The fixed image factory installation system further enables customization and configuration of additional operating systems with corresponding drivers and software applications stack. The additional partitions can be hidden and do not require a visible descriptor.

15 Claims, 3 Drawing Sheets

METHOD AND APPARATUS TO CUSTOMIZE AND CONFIGURE MULTIPLE OPERATING SYSTEMS ON A SERVER

BACKGROUND OF THE INVENTION

1. Field of the Invention

The present invention relates to information handling systems and more particularly, to a method and apparatus to customize and configure multiple operating systems on a server.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use a fixed image installation process within a build to order environment to customize and configure a primary operating system. Examples of a primary operating system include the Windows XP operating system and the Windows Vista operating system available from Microsoft. In known build to order environments, a fixed image installation process configuration may be used to layer a primary operating system onto the information handling system being fabricated. FIG. 1, labeled Prior Art, shows an example of a fixed image installation process. With a known fixed image installation process, after the operating system and software are downloaded onto the information handling system, a fully integrated system test (FIST) process is executed to install system drivers and a software stack onto the primary operating system. After the FIST process is completed, the information handling system is sealed (i.e., packaged) and shipped to a customer.

It is also known to provide media enabled information handling systems. For example, a media enabled information handling system may include a MediaDirect image.

For certain types of fabricated information handling systems, the fixed image installation process can present certain challenges. For example, known fixed image installation processes do not support adding of additional operating systems. It may be desirable to install additional, possibly heterogeneous operating systems, onto certain information handling systems being configured using a fixed image installation process. Also, known fixed image installation processes do not support configuration of operating systems with customized data based upon customer selection. Also, known fixed image installation processes do not support sequential scalability on multiple volumes and operating systems. Also, known fixed image processes may not support customizing hidden or invisible partitions, such as a host protected area (HPA) partition or a depth multiplex partition (DMP).

Additionally, even if it were possible to layer an additional operating system as an image onto a fabricated information handling system, known fixed image installation processes do not allow the build to order process to boot into the additional operating system to customize the additional operating system.

For example, an information handling system manufacturer might wish to offer a gaming operating system on a secondary or additional partition. It would be desirable for the information handling system manufacturer to provide a customer with an option of customizing the gaming operating system at the point of sale. Also for example, an information handling system manufacturer might wish to provide an information handling system with customized and configured versions of multiple operating systems such as a follow-on of the operating system (e.g., the Windows XP operating system and the Windows Vista operating system), on the same information handling system. Such an option is often desired by customers when a new operating system is first available to enable customers to evaluate a new operating system without losing the stability of a previous established operating system.

SUMMARY OF THE INVENTION

In accordance with the present invention, a fixed image factory installation system which enables installation and launching of additional partitions or volumes is set forth. The fixed image factory installation system further enables customization and configuration of additional operating systems with corresponding drivers and software applications stack. The additional partitions can be hidden and do not require a visible descriptor.

More specifically, in one embodiment, the invention relates to a fixed image factory installation system for installing a fixed image onto an information handling system. The system includes an operating system installation module, the operating system installation module installing an operating system onto the information handling system; a fully integrated system test (FIST) module, the FIST module starting the information handling system after the operating system is installed and installing drivers and applications for the installed operating system; an additional operating system installation module, the additional operating system installation module installing an additional operating system onto an additional partition of the information handling system when a multiple operating system indication is set; and, an additional FIST, the additional FIST module accessing the additional partition of the information handling system after the additional operating system is installed and installing drivers and applications for the installed additional operating system.

In another embodiment, the invention relates to a method for installing a fixed image onto an information handling system. The method includes installing an operating system onto the information handling system; starting the information handling system after the operating system is installed and installing drivers and applications for the installed operating system via a fully integrated system test (FIST) module; determining whether a multiple operating system indication is set; installing an additional operating system onto an additional partition of the information handling system when the multiple operating system indication is set; and, accessing the additional partition of the information handling system after the additional operating system is installed via an additional FIST module; and, installing drivers and applications for the installed additional operating system via the additional FIST module.

In another embodiment, the invention relates to an apparatus for installing a fixed image onto an information handling system. The apparatus includes means for installing an operating system onto the information handling system; means for starting the information handling system after the operating system is installed and installing drivers and applications for the installed operating system; means for determining whether a multiple operating system indication is set; means for installing an additional operating system onto an additional partition of the information handling system when the multiple operating system indication is set; and, means for accessing the additional partition of the information handling system after the additional operating system is installed; and, means for installing drivers and applications for the installed additional operating system.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
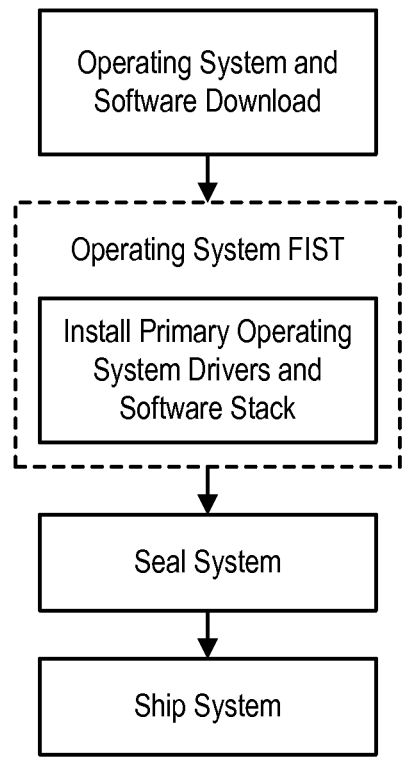
FIG. 1, labeled prior art, shows a flow chart of a fixed image installation process.
Figure 2:
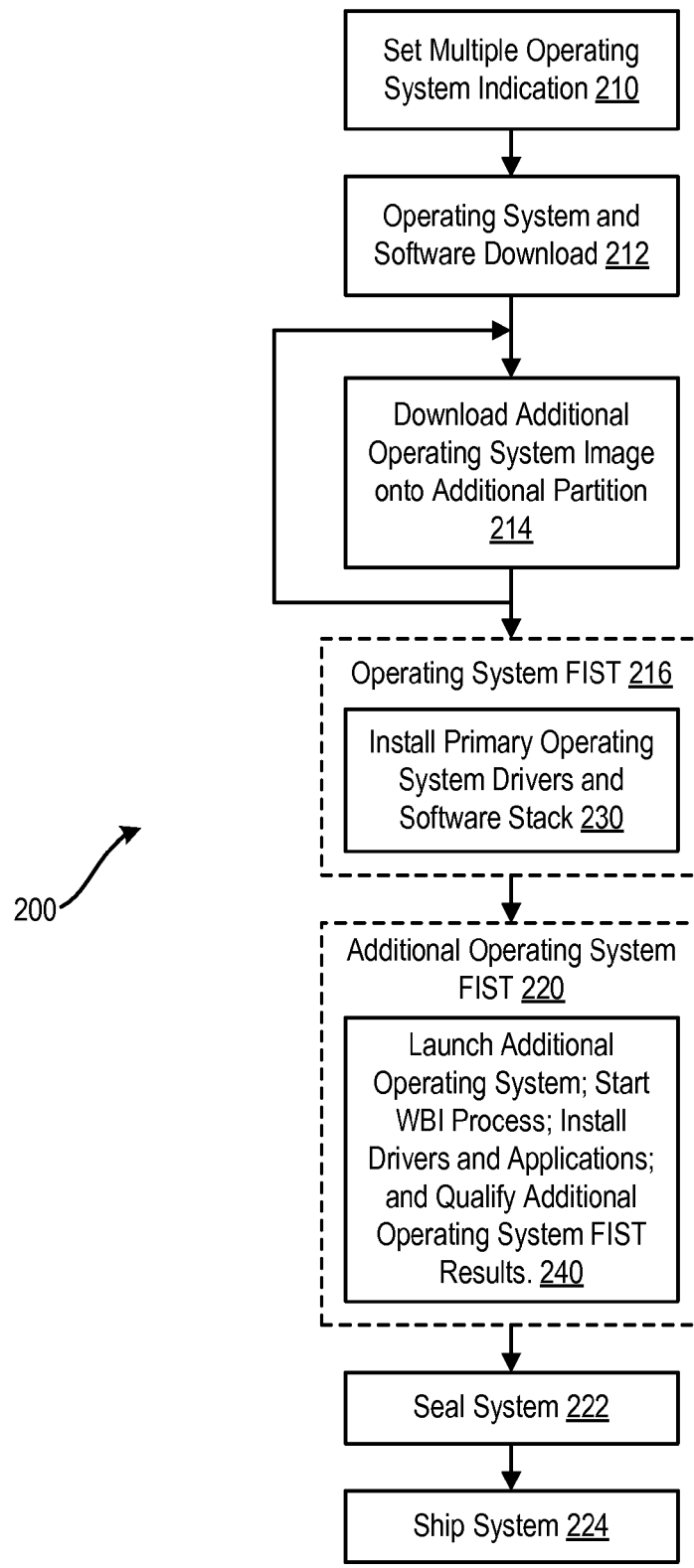
FIG. 2 shows a flow chart of the operation of a fixed image installation process for customizing and configuring multiple operating systems.

Referring to FIG. 2, a flow chart of the operation of fixed image installation system 200 for customizing and configuring multiple operating systems is shown. More specifically, when a fixed image installation system 200 is started in which it is desired that multiple operating systems be installed on the information handling system, a multiple operating system indication is set at step 210. Next, a primary operating system and software are loaded onto a primary partition of the operating system at step 212. Next, an additional operating system is loaded onto an additional partition of the information handling system at step 214. If additional operating systems or software are to be installed onto additional partitions of the information handling system, then the additional operating system is loaded onto another additional partition at this step.

Next, the FIST process is invoked to install the drivers and software stack for the primary operating system at step 216. Next, an additional FIST process is invoked at step 218. After a FIST process has been completed for each additional operating system, the system is sealed at step 222 and shipped at step 224.

The FIST process 230 installs the primary operating system drivers and software stack. The additional FIST process 240 launches the additional operating system, starts a windows based installation (WBI) process, installs drivers and applications for the additional operating system, and qualifies the additional operating system FIST results.

By providing an additional FIST process, a fixed image installation system may install multiple operating systems onto a single information handling system. The fixed image factory installation system 200 includes logic for identifying whether the multiple operating system indication is present. If the multiple operating system indication is present, the factory installation system 200 launches the additional partition to start the additional operating system installation, customization and configuration process. Additionally, drivers and software application factory install scripts of the factory installation system 200 include support for multiple operating system install during the build to order process.

The factory installation system 200 also includes code to trigger the additional FIST process. The additional FIST process includes code to enable multiple operating system installations and to trigger the FIST shell. More specifically, the additional FIST code includes code to create and populate a command (cmd) file that always runs during the additional operating system boot to get FIST started. The additional FIST code also includes code to create any WBI files that are used when invoking an additional WBI process. The additional FIST code also includes changes to a WBI registry (WBIReg) file that is used when executing the additional WBI process. The additional FIST code also includes application program interfaces (API's) to allow running of the WBI process in support OF multiple operating systems. This API is used for customizing the additional operating system.

During a create portion of the factory install process, hardware monitoring code (HARDTACK) is provided to track all driver installations and to omit or skip over certain classes of hardware bangs, as a result of hardware that that does not have drivers available for install and which do not need to be enabled on the additional partition. For example, network drivers are generally not needed for MediaDirect partition.

Additionally, the factory installation system 200 includes cleanup code (AddClean) which cleans up driver folders and registries from the additional partition after the successful installation of drivers and software applications. Additionally, the factory installation system 200 includes a debug failure mode which enables a factory technician to boot into the additional partitions to perform root cause analysis on failures. The factory installation system 200 also includes a logging and exception handling mechanism for tracking any FIST failure on the additional operating system installs.

Figure 3:
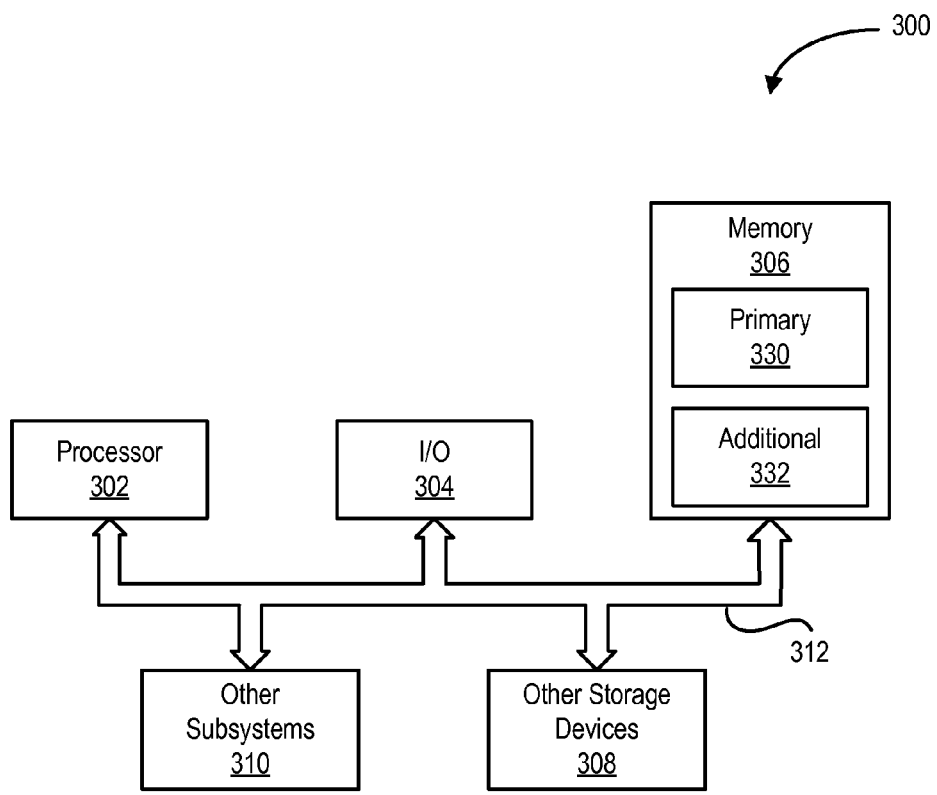
FIG. 3 shows a block diagram of an information handling system having multiple customized and configured operating systems.

Referring to FIG. 3, a block diagram of an information handling system 300 is shown. The information handling system 300 includes a processor 302, input/output (I/O) devices 304, such as a display, a keyboard, a mouse, and associated controllers, non-volatile memory 306 such as a hard disk drive, and other storage devices 308, such as a floppy disk and drive and other memory devices, and various other subsystems 310, all interconnected via one or more buses 312. The software is installed onto the non volatile memory 306. Alternately, the software may be installed onto any appropriate non-volatile memory. The non-volatile memory 306 may also be a primary operating system 320 as well as an additional operating system 322. The primary operating system may be stored in a primary partition of the hard disk drive and the additional operating system 322 may be stored in an additional partition of the hard disk drive. The primary operating system is installed and tested via a FIST process. The additional operating system is tested via an additional FIST process.

The Factory Installation System Test (FIST) process includes starting the information handling system, after software download, to install all drivers and applications. The additional FIST process includes booting the additional partition of the information handling system, after software download, to install all drivers and applications for the additional partition. During the FIST process, the factory install process starts by installing applications identified by a system descriptor record from the customer order. During the additional FIST process, the factory install process installs applications identified by a system descriptor record from the customer order onto the additional partition.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also, for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A fixed image factory installation system for installing a fixed image onto an information handling system comprising:
   a computer system comprising at least one processor;
   an operating system installation module, the operating system installation module executing on the computer system and installing an operating system onto the information handling system;
   a fully integrated system test (FIST) module executing on the computer system, the FIST module starting the information handling system after the operating system is installed and installing drivers and applications for the installed operating system;
   an additional operating system installation module executing on the computer system, the additional operating system installation module installing an additional operating system onto an additional partition of the information handling system when a multiple operating system indication is set; and,
   an additional FIST module executing on the computer system, the additional FIST module comprising code to trigger an additional FIST process, the additional FIST module accessing the additional partition of the information handling system after the additional operating system is installed and installing drivers and applications for the installed additional operating system; and wherein
   the additional FIST module tracks driver installation instructions to the additional partition and omits installing drivers which do not need to be enabled on the additional partition;
   the additional operating system installation module includes a cleanup module, the cleanup module removing unneeded driver folders and registries from the additional partition after successful installation of drivers and applications; and,
   the additional FIST module includes a debug failure mode, the debug failure mode enabling booting into the additional partition to perform root cause analysis on failures.

2. The fixed image factory installation system of claim 1 wherein:
   the additional partition is hidden and does not require a visible descriptor.

3. The fixed image factory installation system of claim 1 wherein:
   the additional operating system includes a MediaDirect operating system.

4. The fixed image factory installation system of claim 1 wherein:
   the additional operating system includes a customized and configured version of a new operating system and the operating system is an established operating system.

5. The fixed image factory installation system of claim 1 wherein:
   the additional FIST module starts a windows based installation process and qualifies results of the installation of the additional operating system.

6. A method for installing a fixed image onto an information handling system comprising:
   installing an operating system onto the information handling system;
   starting the information handling system after the operating system is installed and installing drivers and applications for the installed operating system via a fully integrated system test (FIST) module;

determining whether a multiple operating system indication is set;
installing an additional operating system onto an additional partition of the information handling system when the multiple operating system indication is set; and,
accessing the additional partition of the information handling system after the additional operating system is installed via an additional FIST module the additional FIST module comprising code to trigger an additional FIST process; and,
installing drivers and applications for the installed additional operating system via the additional FIST module; and wherein
the additional FIST module tracks driver installation instructions to the additional partition and omits installing drivers which do not need to be enabled on the additional partition;
installing the additional operating system includes removing unneeded driver folders and registries from the additional partition after successful installation of drivers and applications;
the additional FIST module includes a debug failure mode, the debug failure mode enabling booting into the additional partition to perform root cause analysis on failures.

7. The method of claim 6 wherein:
the additional partition is hidden and does not require a visible descriptor.

8. The method of claim 6 wherein:
the additional operating system includes a MediaDirect operating system.

9. The method of claim 6 wherein:
the additional operating system includes a customized and configured version of a new operating system and the operating system is an established operating system.

10. The method claim 6 wherein:
the additional FIST module starts a windows based installation process and qualifies results of the installation of the additional operating system.

11. An apparatus for installing a fixed image onto an information handling system comprising:
means for installing an operating system onto the information handling system;
means for starting the information handling system after the operating system is installed and installing drivers and applications for the installed operating system;
means for determining whether a multiple operating system indication is set;
means for installing an additional operating system onto an additional partition of the information handling system when the multiple operating system indication is set; and,
means for accessing the additional partition of the information handling system after the additional operating system is installed; and,
means for installing drivers and applications for the installed additional operating system; and wherein
the additional FIST module tracks driver installation instructions to the additional partition and omits installing drivers which do not need to be enabled on the additional partition;
the means for installing the additional operating system includes means for removing unneeded driver folders and registries from the additional partition after successful installation of drivers and applications;
the means for installing drivers and applications on the additional operating system includes means for enabling a debug failure mode, the debug failure mode enabling booting into the additional partition to perform root cause analysis on failures.

12. The apparatus of claim 11 wherein:
the additional partition is hidden and does not require a visible descriptor.

13. The apparatus of claim 11 wherein:
the additional operating system includes a MediaDirect operating system.

14. The apparatus of claim 11 wherein:
the additional operating system includes a customized and configured version of a new operating system and the operating system is an established operating system.

15. The apparatus claim 11 wherein:
the means for installing drivers and applications for the installed additional operating system starts a windows based installation process and qualifies results of the installation of the additional operating system.

\* \* \* \* \*